3,630,981
COPOLYMERS OF ALPHA METHYL STYRENE
AND VINYL TOLUENE AND PROCESS OF
PREPARATION
Dean A. Finfinger, Monongahela, and Clarence C. Campbell, Clairton, Pa., assignors to Pennsylvania Industrial Chemical Corporation
Filed June 9, 1969, Ser. No. 831,540
Int. Cl. C08f 45/52, 19/04
U.S. Cl. 260—28.5                1 Claim

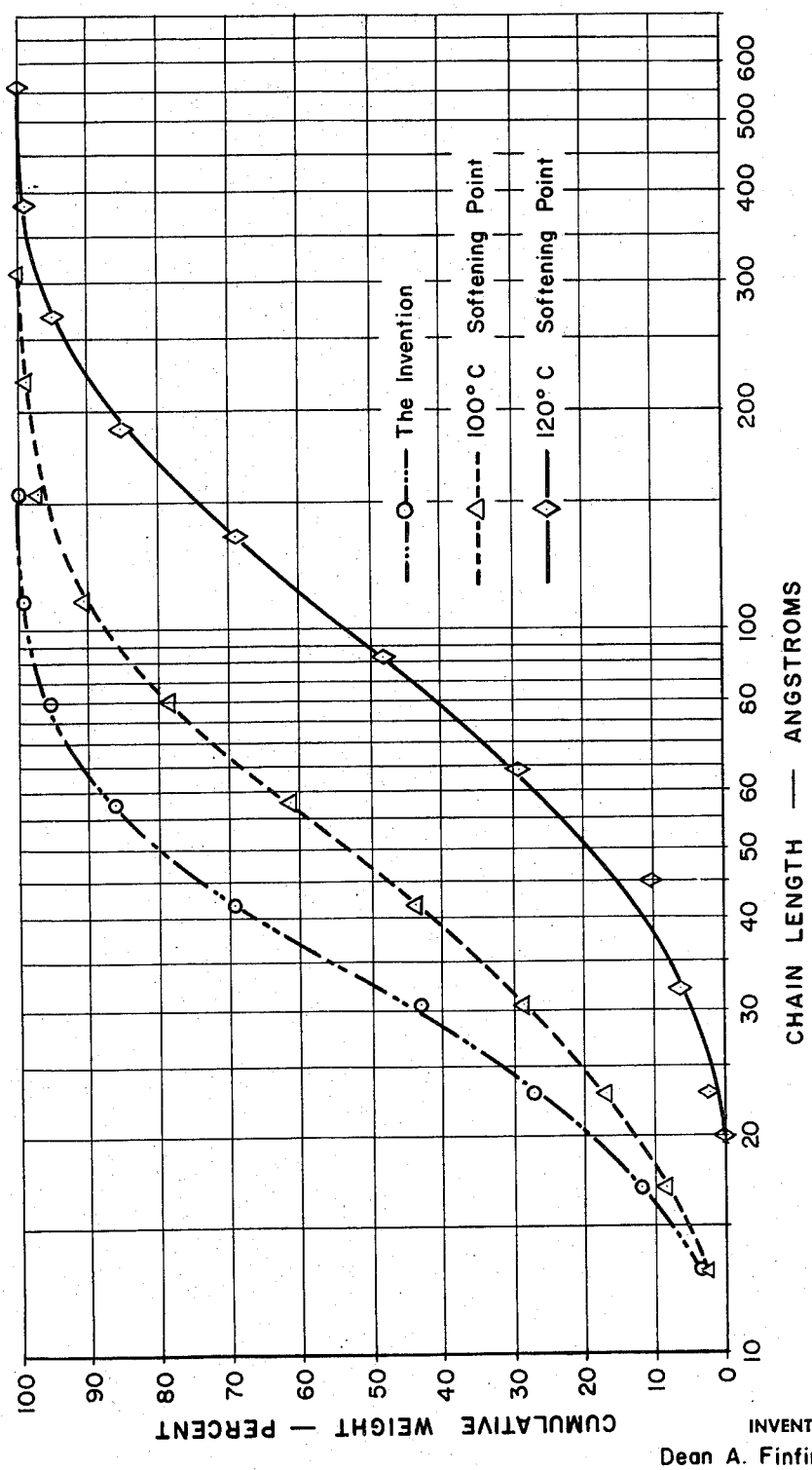

ABSTRACT OF THE DISCLOSURE

Hot melt coating compositions are disclosed which comprise ethylene polymers, paraffin wax, and copolymers of alpha methyl styrene and vinyl toluene, 95% of said copolymers having molecular chain lengths less than 100 angstroms, said copolymer having a Ring and Ball softening point in the range of 90 to 98° C.

---

This invention relates to resinous copolymers of alpha methyl styrene and vinyl toluene and to a process for their preparation.

It is known that monomers of alpha methyl styrene and vinyl toluene may be copolymerized to form resins of light color and having softening points (Ring and Ball) of about 100° C. and higher. These resins have been useful in the production of hard drying varnishes, adhesives and the like. A process for producing such resins is found in U.S. Pat. No. 3,000,868.

The known resinous copolymers of alpha methyl styrene and vinyl toluene having softening points in the 100° C. range, while soluble in a variety of solvents, have been found to be only slightly soluble in paraffin wax. Accordingly, the use of these resins in hot melt compounds, particularly in wax blends, for coatings has been heretofore limited. Wax coating blends containing the known resins are milky white in color at low temperatures and produce a clouded surface when applied to a substrate. The undesirable solubility characteristics of these known resins in wax is especially unfortunate since in pure form the resins possess the other qualities needed in coatings for food packaging; namely, water white color, good color stability and negligible odor emission.

It has been found to be highly desirable to add resinous materials to hot melt coating blends for food packaging. Coatings produced from wax alone or, more commonly, blends of wax and ethylene copolymers exhibit good moisture vapor resistance, good water resistance and high flexural strength at low temperatures; and these coatings are widely used in food packaging. However, coatings of wax or wax ethylene copolymers alone do not possess good adhesion properties when applied to various substrates. The addition of resinous materials to the coatings blend renders it adherent.

The solubility of the known alpha methyl styrene and vinyl toluene copolymer resins in wax blends does improve when the softening point of the resin is drastically lowered but low softening point resins are not useful in wax coatings because they do not impart the hardness required in such coatings.

We have discovered a process for producing resinous copolymers of alpha methyl styrene and vinyl toluene which exhibit unanticipated high solubility in paraffin wax and yet have high softening points, thereby making them ideal for use in wax coating blends. The wax solubility of my resin is believed to be achieved by carefully controlling the molecular chain length and molecular weight distribution of the copolymers. Further, our copolymers of alpha methyl styrene and vinyl toluene retain the desirable properties of water white color, good color stability and negligible odor emission.

We provide a resinous composition comprising copolymers of alpha methyl styrene and vinyl toluene, 95 percent by weight of said copolymers having molecular chain lengths less than 100 angstroms, said composition being characterized by a softening point (Ring and Ball) in the range of 90 to 98° C. Preferably, the composition of our invention has a weight ratio of vinyl toluene to alpha methyl styrene in the range of 2.5:1 to 4.5:1. We preferably provide that the composition is further characterized by having a cloud point solubility of less than 165° F. in a 50° solution of paraffin wax.

We further provide a hot melt composition consisting essentially of paraffin wax, ethylene copolymers and the composition of the present invention. The ethylene copolymers which may be used in the hot melt composition include ethylene vinyl acetate (EVA), ethylene ethyl acrylate (EEA) and ethylene-isobutyl acrylate (IBA); however, we prefer EVA. We further provide a coating for food containers formed from the hot melt composition just recited.

We further provide a process for preparing copolymers of alpha methyl styrene and vinyl toluene comprising the steps of reacting a mixture of monomers of vinyl toluene and alpha methyl styrene in an inert diluent in the presence of an acid clay catalyst at a temperature in the range of 13° to 18° C., the weight ratio of said vinyl toluene to alpha methyl styrene in said mixture being in the range of 2.5:1 to 4.5:1; and recovering the product of said reaction.

Other details, objects and advantages of the invention will become apparent from the following description and examples.

PREPARATION OF THE RESIN

The resinous composition of the present invention is produced by reacting monomers of alpha methyl styrene and vinyl toluene in the presence of an acid clay catalyst. The proportions of the starting materials are not critical although we prefer to maintain the ratio of vinyl toluene to alpha methyl styrene charged to the reactor in the range of about 2.5:1 to 4.5:1 on a weight basis. The amount of catalyst is preferably about 3.3% by weight based on reactants but this may be varied without adverse effect.

What follows is an example of procedures which may be followed to produce the invention. It will be noted in the example that the monomers are added to a suspension of the catalyst in an inert diluent. This sequence is not essential because equally good results may be obtained by varying the addition procedures.

A 500 cc. conventional three-necked flask equipped with an agitator, a thermometer and a gas inlet for providing a nitrogen blanket is charged with 67 grams of an inert diluent (in this case, Solvesso 100, the trademark of a petroleum solvent having the composition (volume percent): 98.9% aromatics and 1.1% paraffins; and supplied by Humble Oil Corporation). The system is purged with nitrogen and a nitrogen blanket is maintained during the reaction period. 3.3 grams of an acid clay catalyst (in this case, Filtrol grade 22 acid clay, the trademark of a product supplied by Filtrol Corporation) is added to the flask and suspended in the diluent by stirring.

The temperature of the mixture is adjusted to 16° C. and a mixture of monomers consisting of 80 grams of vinyl toluene and 20 grams of alpha methyl styrene is added to the flask over a period of 35 minutes. During the addition period, the temperature of the reaction mixture is maintained at 16° C. plus or minus 2° C. with an alcohol-Dry Ice bath.

After the monomer addition is completed, the temperature is raised to 50° C. and held at this temperature for about 30 minutes to assure completion of the reaction. The contents of the flask are heated to 60° C. and filtered through filter paper using a Buchner funnel to which a vacuum is applied. Filtration may be facilitated by applying a pre-coat of filter aid to the funnel.

Solvesso 100 and the catalyst was Filtrol grade 22 acid clay.

The product yields of the runs reported in Table I all ranged above 90 percent and the resins produced all exhibited water white color as measured an the Gardner scale. From the Table, it can be seen that the proportions of starting materials, the reaction temperature, the addition

TABLE I

| Run No. | Vinyl toluene[1] (by weight) | Percent monomers in solution | Type of addition | Percent clay to monomers | Reaction temperature, °C. | Clay or monomer addition time (minutes) | Holding time (minutes after reaction | Softening point, °C. |
|---|---|---|---|---|---|---|---|---|
| 1 | 3:1 | 50 | Direct | 1.0 | 43–45 | 15 | 30 | 89 |
| 2 | 3:1 | 50 | Reverse | 1.5 | 20–25 | 35 | 30 | 93 |
| 3 | 3:1 | 50 | do | 1.5 | 15–20 | 35 | 30 | 98 |
| 4 | 3:1 | 40 | do | 1.87 | 15–20 | 40 | 40 | 93.5 |
| 5 | 3:1 | 60 | do | 1.25 | 15–20 | 40 | 40 | 95 |
| 6 | 3:1 | 50 | do | 1.5 | 10–13 | 30 | 40 | 94 |
| 7 | 3:1 | 50 | do | 2.0 | 5–8 | 30 | 40 | 97.5 |
| 8 | 4:1 | 60 | do | 1.67 | 10–12 | 32 | 40 | 93.5 |
| 9 | 4:1 | 60 | do | 2.5 | 10–12 | 32 | 40 | 94 |
| 10 | 4.1 | 60 | do | 3.83 | 10–12 | 32 | 30 | 94 |

[1] To alpha methyl styrene ratio.

The filtrate is distilled to remove the solvent and any low polymers or heavy oils which may be present. 97 to 98 grams of resinous material are recovered.

The resin exhibits the following properties:

Color (Gardner scale)—water white
Softening point (Ring and Ball)—90–98° C.
Cryoscopic molecular weight—800
Gravity at 25° C.—1.04
Refractive index—1.585
Bromine No.—0.3–0.6

Molecular size distribution studies conducted according to the well known gel permeation chromatography technique indicate that the maximum chain length of the copolymer molecules of the new resin is markedly lower than maximum chain lengths of the known alpha methyl styrene/vinyl toluene copolymer molecules. For instance, the maximum chain length of molecules present in 98 weight percent of a sample of the resin of the present invention was about 90 angstroms (A.). Similar weight percent samples of alpha methyl styrene/vinyl toluene copolymers, produced by known techniques and having softening points of about 75° C., 100° C. and 120° C. exhibited maximum chain lengths exceeding that of the invention; namely, 110 A., 200 A. and 320 A., respectively. These data clearly indicate that the molecules of the new resin have maximum chain lengths of approximately one half those of known alpha methyl styrene/vinyl toluene copolymers having similar hardness characteristics.

The gel permeation chromatography studies were also revealing as to the molecular size distribution of the resin of the present invention compared with the known alpha methyl styrene/vinyl toluene copolymers. The accompanying figure is a plot of molecular chain length against cumulative weight percent for the invention and for two samples of the prior art copolymers, one having a similar softening point and the other a higher softening point.

From the figure, it can be observed that the range of chain lengths for molecules of the invention in that portion of the sample between 5 and 95 cumulative weight percent varies from about 13 to 76 A. Similar portions of the samples having softening points of 100° C. and 120° C. exhibit chain lengths varying from about 14 to 145 A. and from about 30 to 270 A. respectively.

For further examples of the invention, reference may be had to Table I below. There, the data obtained from numerous runs made under varying conditions and with varying amounts and types of materials is presented in tabular form. The equipment and general procedures (except where noted) described above were observed in carrying out these runs. In all cases, the inert diluent used was Solvesso 100 and the catalyst was Filtrol grade 22 acid clay.

procedure and the addition time may be varied with no adverse effect upon the properties of the final product.

WAX SOLUBILITY

Solubility tests were undertaken to determine the adaptability of the resin of the present invention for use in wax coating blends. Two separate samples of copolymers of alpha methyl styrene and vinyl toluene were prepared in accordance with the process of the invention on a pilot plant scale as follows:

Resin A

The equipment utilized to prepare the resin was a 50 gallon, glass-lined vessel provided with an agitator. The initial charge consisted of 96 lbs. of Solvesso 100 and 5 lbs. of Filtrol grade 22 acid clay. The agitator was operated at 180 r.p.m. and a nitrogen blanket was maintained in the vessel. 115 lbs. of vinyl toluene and 29 lbs. of alpha methyl styrene were added to the contents of the vessel over a period of about 75 minutes. During the addition period the temperature of the reaction mixture was maintained at 13° C. plus or minus 2° C. At the end of the addition period, the temperature of the contents of the vessel was raised to 50° C. and held there for about 1 hour. The temperature was further raised to 60° C. in preparation for recovery of the product. 2 lbs. of filter aid and 2 lbs. of attapulgus clay were added to the vessel and the contents filtered. The filtrate was distilled and the resinous product recovered exhibited the following properties:

Yield—96.7%
Softening point—94.5° C.
Color (Gardner)—Water white
OMS cloud point—4° C.

Resin B

This resin was prepared in accordance with the same procedures utilized for the preparation of Resin A except that the agitator was operated at 190 r.p.m. and the addition time was 90 minutes. The resulting product exhibited similar properties to those of Resin A.

The solubility of the samples (hereinafter designated "A" and "B") was determined in (1) a paraffin wax alone; (2) a microcrystalline wax alone; (3) blends of ethylene vinyl acetate (EVA) and paraffin wax wherein the concentration of vinyl acetate in the EVA was varied; and (4) blends of EVA and paraffin wax wherein the proportions of the three ingredients were widely varied. The results of those tests are presented below in Tables II–V.

The solubility of the new resin was, in all cases, measured by the cloud point test, a technique well-known to persons skilled in the art. By that method, the solvents and solute (here the resin) are heated together until a clear solution is obtained. The temperature is then decreased until cloud formation is observed. The temperature in ° F. is noted and that value is the measure of solubility. The lower the temperature, the higher the degree of solubility of the solute in the solvents.

Table II shows the solubility of the resin of the present invention in paraffin wax having a melting point of 155° F. Solubility determinations were made in solutions of wax and the new resin having the wax concentrations indicated.

TABLE II

| Resin | Percent wax | | |
|---|---|---|---|
| | 30 | 50 | 70 |
| A, ° F | 163 | 153 | 154 |
| B, ° F | 158 | 164 | 168 |

Table III presents the indicia of solubility of the new resin tested in a 50 percent solution of microcrystalline wax having a melting point of 180° F.

TABLE III

| Resin: | 50% microcrystalline wax, ° F. |
|---|---|
| A | 244 |
| B | 241 |

Table IV shows the solubility of the new resin in blends comprising 60 percent paraffin wax, 20 percent EVA and 20 percent resin. The concentration of vinyl acetate in the EVA copolymer was varied as indicated.

TABLE IV

| Resin | Percent vinyl acetate | | | |
|---|---|---|---|---|
| | 18 | 25 | 28 | 33 |
| A, ° F | 176 | 160 | 167 | 160 |
| B, ° F | 184 | 166 | 158 | 158 |

Finally, blends of paraffin wax, EVA and the new resin were prepared and the cloud point temperatures observed. The results of these tests are shown in Table V. Blends 1-8 were prepared with varying proportions of the three components as indicated to simulate the broad range over which wax coatings may be formulated. The EVA used in these tests had 28% vinyl acetate in the copolymer; the most widely used variety in paraffin wax coatings. The paraffin wax component had a melting point of 155° F.

TABLE V

| Blend number | 1 | 2 | 3 | 4 | 5 | 6 | 7 | 8 |
|---|---|---|---|---|---|---|---|---|
| EVA | 15 | 20 | 25 | 20 | 20 | 20 | 20 | 20 |
| Wax | 70 | 60 | 50 | 70 | 60 | 50 | 40 | 30 |
| Resin | 15 | 20 | 25 | 10 | 20 | 30 | 40 | 50 |
| Resin: | | | | | | | | |
| A, ° F | 156 | 158 | 158 | 153 | 158 | 162 | 166 | 170 |
| B, ° F | 154 | 158 | 160 | 158 | 158 | 158 | 168 | 186 |

¹ Proportions in parts by weight.

In all of the foregoing solubility tests, the cloud point temperatures achieved with the new resin are significantly lower than those obtainable with known alpha methyl styrene/vinyl toluene copolymers having similar softening points.

Referring specifically to Table V, Blend No. 2 represents the most common paraffin wax coating composition. The solubility of the resin of the present invention exhibited a dramatic increase in solubility of the resin of the prior art. In view of the 155° F. melting point of the wax, the results for Blend No. 2 indicate a condition tantamount to solution in the solid state.

HOT MELT COATINGS

Reference is made above to the advantageous use of the composition of the present invention in hot melt compounds. Hot melt compounds are 100 percent solid materials which become sufficiently fluid at elevated temperatures to permit application to various substrates. Blends can be formulated to give various properties as required by the end use of the product. Hot melt compounds are particularly useful in protective coatings, decorative coatings, laminants, adhesives and sealants.

Most hot melt compounds are composed of one or more of the following:

(1) Elastomers such as ethylene copolymers, polyethylene and butyl rubber;

(2) Tackifiers and sealing promoters usually consisting of a resinous material;

(3) Surface hardeners and gloss promoters usually consisting of a resinous materials;

(4) Plasticizers or viscosity depressants such as wax, organic plasticizers and resinous materials;

(5) Fillers, pigments or extenders such as carbon black, metallic powders and the like;

(6) Antioxidants or heat stabilizers, the best example of which is butylated hydroxytoluene (hereinafter "BHT").

Hot melt blends formulated with wax, ethylene copolymers and the resin of the present invention may be advantageously used for corrugated coatings, folding carton coatings and food packaging. The blends may be prepared in heated, sigma-blade, high shear mixers or in any heated, agitated tank that has sufficient heating jacket or heating coil capacity to bring the blend to the solubility temperature. In the sigma-blade, high shear type of equipment, the compounds can best be prepared by thoroughly masticating the resin and ethylene copolymers at high shear conditions and diluting and thinning the resultant product by wax addition as the final component. In agitated tank type blenders, the wax should first be heated to approximately 70–100° F. above its melting point and the ethylene copolymers added slowly to the hot wax. After all of the ethylene copolymer has dissolved in the hot wax, the resin should be slowly added.

Several hot melt compounds were formulated using the resin of the present invention. The formulations appear below and are designated "C," "D," "E," "F," and "G." Coating formulations "C" and "D" were applied to substrates by methods well known in the art and the properties of the resultant coatings measured by standard techniques. Those test data appear in Table VI below.

Formulation C.—Hot tack/heat seal coating

| | Parts (by wt.) |
|---|---|
| Resin of the invention | 25 |
| EVA (28% vinyl acetate) | 30 |
| Paraffin wax (155° F. M.P.) | 45 |
| BHT (antioxidant) | 0.1 |

Formulation D.—Corrugated coating

| | Parts (by wt.) |
|---|---|
| Resin of the invention | 15 |
| EVA (28% vinyl acetate) | 15 |
| Paraffin wax (155° F. M.P.) | 60 |
| Microcrystalline wax (180° F. M.P.) | 10 |
| BHT (antioxidant) | 0.1 |

Formulation E.—Heat seal coating for folding cartons

| | Parts (by wt.) |
|---|---|
| Resin of the invention | 15 |
| EVA (6 melt index—28% vinyl acetate) | 12.5 |
| EVA (150 melt index—28% vinyl acetate) | 12.5 |
| Paraffin wax (155° F. M.P.) | 15.0 |
| Microcrystalline wax (180° F. M.P.) | 10.0 |
| BHT (antioxidant) | 0.1 |
| Erucamide (slip agent) | 0.2 |

Formulation F.—Extrusion hot melt coating

| | Parts (by wt.) |
|---|---|
| Resin of the invention | 10 |
| EVA (low melt index—28% vinyl acetate) | 35 |
| Paraffin wax (155° F. M.P.) | 55 |
| BHT (antioxidant) | 0.1 |

Formulation G.—Hot melt case sealing adhesive

| | Parts (by wt.) |
|---|---|
| Resin of the invention | 35 |
| EVA (low melt index—low vinyl acetate) | 25 |
| Polyethylene (240° F. M.P.) | 15 |
| Microcrystalline wax (180° F. M.P.) | 25 |
| BHT (antioxidant) | 0.2 |

TABLE VI.—STANDARD TEST RESULTS

| Properties | Formulation C | Formulation D |
|---|---|---|
| Cloud point, °F | 158 | 156 |
| Viscosity at, °F.: | | |
| 250, cps | 12,000 | 500 |
| 275, cps | 8,000 | 400 |
| 300, cps | 5,500 | 300 |
| Heat stability—color [1]: | | |
| Initial | | <1 |
| 7 hours at 275° F | | 1− |
| 15 hours at 275° F | | 1− |
| 22 hours at 275° F | | 1+ |
| 22 hours at 275° F. plus 2 hours at 300° F | | 2− |

| Film data | ¾ mil on glassine | ¾ mil on M.G. Kraft paper |
|---|---|---|
| GFMVTR: [2] | | |
| Flat | 0.5 | 0.3 |
| Creased | 0.6 | 0.3 |
| Gradient bar data (coating to coating): | | |
| Block point, °F | 135 | 140 |
| Migration point, °F | 145 | 140 |
| Heat seal start, °F | 140 | 145 |
| Heat seal loss, °F | 230 | 215 |
| Heat seal range—coating, temperature (1.0 oz. spring), °F | 140-170 | |

[1] Gardner colors taken continuously.
[2] Grams/100 square inches/24 hours at 100° F. and 90% R.H.

Coating blends of paraffin wax, EVA and the alpha methyl styrene/vinyl toluene copolymers of the present invention impart excellent adhesion to the substrate without requiring a porous surface for releasing solvent or water. They may be smoothly and easily applied to various substrates including fiberboard, corrugated board, and flexible packaging materials such as papers, foils and films.

The use of these coatings eliminates fire hazards and toxicity problems ordinarily associated with coatings utilizing solvents. In many cases, greater economy is achieved since no large drying ovens or heaters are necessary.

We claim:
1. A hot melt composition consisting essentially of:
 (A) 10 to 50 percent by weight of a resinous composition consisting of copolymers of alpha methyl styrene and vinyl toluene, 95 percent by weight of said copolymers having molecular chain lengths less than 100 angstroms, said composition being characterized by a softening point (Ring and Ball) in the range of 90 to 98° C., said resinous composition having a weight ratio of vinyl toluene to alpha methyl styrene in the range of 2.5:1 to 4.5:1;
 (B) 15 to 25 percent by weight of ethylene vinyl acetate copolymer containing 18 to 33 percent by weight vinyl acetate; and
 (C) 30 to 70 percent by weight of paraffin wax.

References Cited
UNITED STATES PATENTS

| | | | |
|---|---|---|---|
| 3,000,868 | 9/1961 | Powers | 260—88.2 C |
| 3,306,882 | 2/1967 | Pullen | 260—28.5 AV |

MORRIS LIEBMAN, Primary Examiner

P. R. MICHL, Assistant Examiner

U.S. Cl. X.R.

260—8.2 C